E. R. IWAGAMI.
PHOTO CAMERA.
APPLICATION FILED MAY 2, 1917.
1,273,373.
Patented July 23, 1918.
2 SHEETS—SHEET 1.
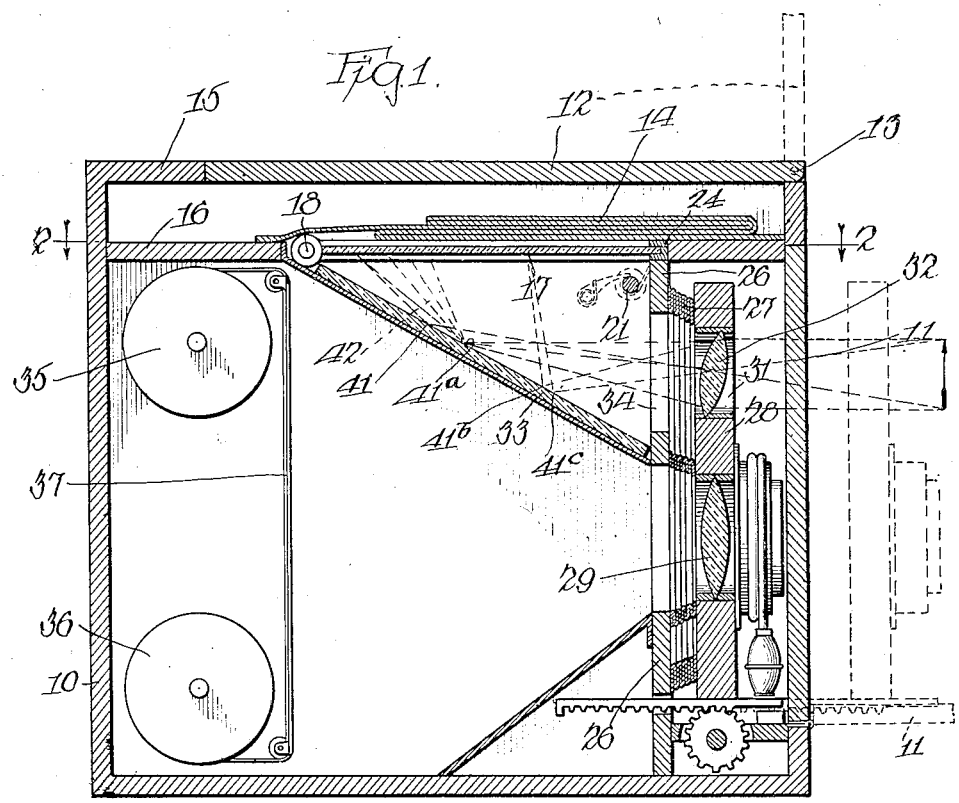

E. R. IWAGAMI.
PHOTO CAMERA.
APPLICATION FILED MAY 2, 1917.

1,273,373.

Patented July 23, 1918.
2 SHEETS—SHEET 2.

Inventor:
Echi R. Iwagami

Witness:

UNITED STATES PATENT OFFICE.

ECHI R. IWAGAMI, OF CHICAGO, ILLINOIS.

PHOTO-CAMERA.

1,273,373.   Specification of Letters Patent.   Patented July 23, 1918.

Application filed May 2, 1917. Serial No. 165,816.

*To all whom it may concern:*

Be it known that I, ECHI R. IWAGAMI, a subject of the Emperor of Japan, residing at Chicago, in the county of Cook and State of Illinois, have invented certain new and useful Improvements in Photo-Cameras, of which the following is a specification.

My invention relates to cameras and has for its primary object the provision of improved devices for properly centering in the camera the subject to be photographed.

A further object of my invention is the provision of improved mounting for the ground glass of the finding mechanism.

Other objects and advantages of my invention will become apparent from the following description taken in conjunction with the accompanying drawings which form a part of this specification and illustrate the preferred embodiment of my invention.

Figure 1 is a vertical longitudinal section of my invention taken approximately on line 1—1 of Fig. 2.

Fig. 2 is a section taken on line 2—2 of Fig. 1.

Figure 3:
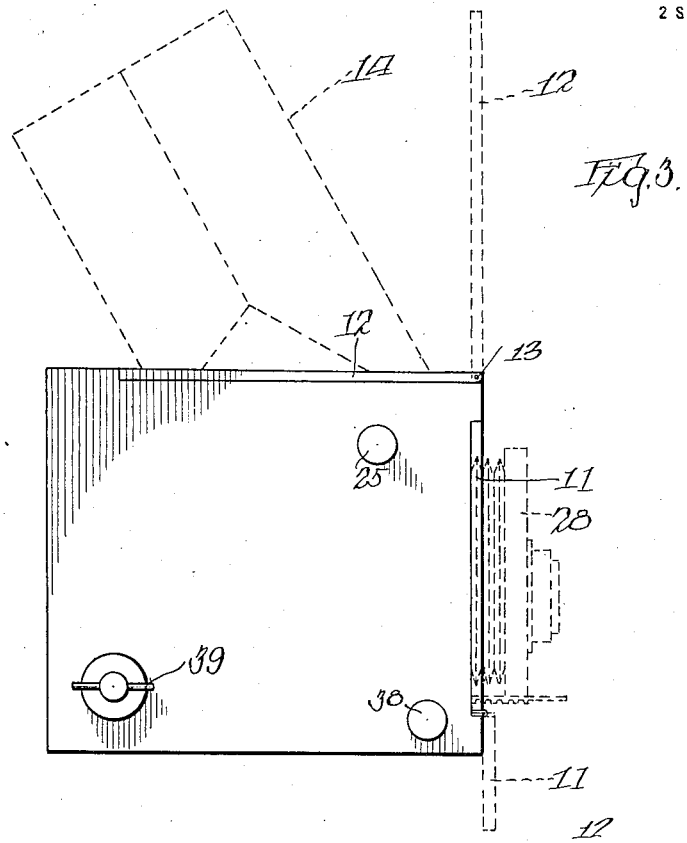
Fig. 3 is a side elevation of my invention showing in dotted lines the opened position of various parts.
Figure 4:
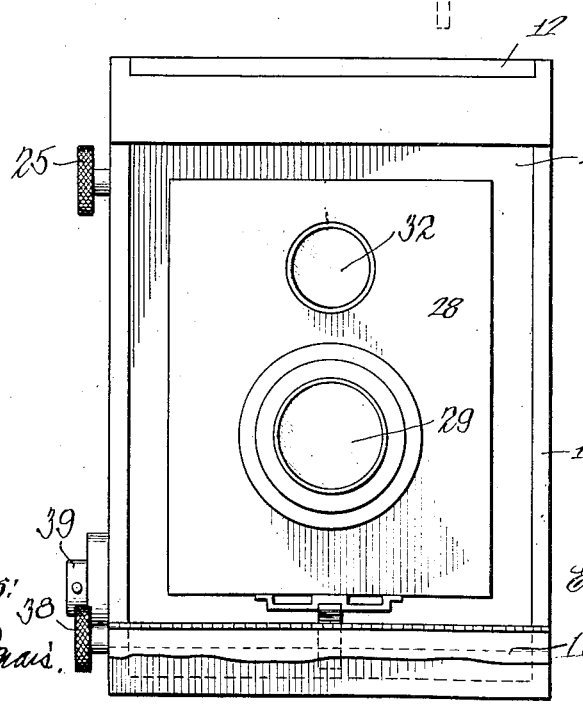
Fig. 4 is a front elevation of my invention with the forward door removed to disclose the two lenses in front elevation.

Reference numeral 10 indicates generally the containing box of a camera provided with a forward door 11 and a top door 12. The top door 12 is pivoted as at 13 and may be elevated into the dotted line position shown in Figs. 1 and 3 to admit of the opening of a finding hood 14 from the folded position shown in Fig. 1 to the extended position illustrated in Fig. 3. It will be seen that the finding hood when opened is tilted backwardly toward the eyes of the operator as he holds the camera in front of him in position to photograph an object also in front of him.

Spaced slightly below the top 15 of the camera is a horizontal partition 16 apertured in its central portion to receive a ground finding glass 17 which at its rear end is pivoted as at 18 and is engaged by two coil springs 19 which normally press it upwardly about its pivot from the horizontal position illustrated in Fig. 1. Positioned below the ground glass 17 and adjacent its forward edge is a shaft 21 engaged preferably at both ends by friction pawls 22 which are spring pressed against the smooth surface of the shaft to hold it against rotation. Cords 23 are secured at one end to the forward portion of the frame 24 of the ground glass and, passing around the shaft 21, are secured thereto. A handle 25 protruding outwardly of the box 10 provides means for manually rotating the shaft 21. The vertical partition 26 is mounted in the camera in spaced relation to the forward door 11 and carries the usual focusing bellows 27 and lens frame 28. Mounted in the lens frame is an ordinary camera lens 29 and above the same, in a separate aperture 31, is mounted a finding lens 32 which is tilted forward at its upper extremity to give its axis a pitch at an angle to the horizontal, that is a pitch downward in front of the lens and upward back of the lens. The axis of the finding lens is not laterally turned. A reflecting mirror 33 is positioned at a decided angle to the horizontal, preferably extending from the bottom of the finding aperture 34 in partition 26 forwardly to a point adjacent the pivot 18 of the ground glass. This reflector 33 is positioned preferably at an angle of less than 45 degrees with respect to the horizontal partition 16.

At 35 and 36 are shown the ordinary reels carrying the sensitized film 37, and it will be understood that the exposed portion of the film is inclosed by light proof partitions in any suitable manner. At 38 is shown the ordinary handle for moving the lens frame 28, and thereby extending the bellows 27, while at 39 is shown the customary handle by which the film is moved across the field of the camera lens 29. In the operation of my invention the camera lens is adjusted forwardly into the dotted line position of Fig. 1, for example, in order to properly focus the subject upon the film 37, the ordinary graduated scale for determining the proper focus being omitted from the drawings. The forward tilting of the upper extremity of the finding lens 32 causes the rays from the object passing through said lens to strike the mirror at points 41, 41$^a$, 41$^b$, and 41$^c$ at smaller angles than if the finding lens were vertical and likewise this tilting of the finding lens coöperates with the mirror, because of the low pitch at which the mirror is set, to project the reflected rays (numbered 42 in Fig. 1) upwardly and backwardly with respect to the vertical so that their axis is parallel and substantially central with the axis of the finding hood 14 when that hood is in opened position. In order that the subject to be photographed may be very clearly brought out upon the ground glass 17, the above described pivotal mounting of said glass is provided. By manipulation of the handle 25 the shaft 21 is rotated against the frictional pressure of the pawls 22 and may be given any desired position above the horizontal. Upon releasing the handle 25 the pawls 22, by reason of their frictional engagement with the shaft 21, maintain the ground glass in the particular position to which it has been elevated, the springs 19 of course operating to hold the ground glass upwardly and the pawls 22, by their friction, overcoming the tendency of the springs 19 to further elevate the ground glass. The operator may thus secure a very perfect focus of the subject upon the ground glass.

While I have illustrated and described the preferred embodiment of my invention, it is obvious that one skilled in the art may make modifications thereof without departing from the spirit of the invention. I wish therefore not to be restricted to the precise embodiment shown except in so far as the same is limited in the appended claims.

I claim:

1. In a camera, the combination with a tilted finding lens and a reflector for said lens, of a ground glass positioned to receive the reflected rays from the lens and mounted for adjustment in the beam of light thrown on it.

2. In a camera, the combination with a reflector and a ground glass positioned to receive rays reflected therefrom, of a finding lens mounted substantially in the plane of the lens of the camera and tilted at its upper extremity forwardly of said plane.

3. In a camera, the combination with a lens frame carrying a camera lens, of a finding lens mounted in said frame with its upper extremity tilted forwardly with respect to the vertical, a reflector positioned in the camera behind said finding lens, and an adjustable ground glass mounted to receive rays reflected from said lens.

4. In a camera, the combination with a horizontal partition in the camera, of a vertical lens frame, a finding lens mounted in said frame with its upper extremity tilted forwardly and positioned below said partition, a mirror positioned rearwardly of said lens and at an angle of less than forty-five degrees with respect to said partition, and a ground glass mounted in said partition in position to receive rays reflected from the mirror.

5. In a camera, the combination with a horizontal partition in the camera, of a vertical lens frame, a finding lens mounted in said frame with its upper extremity tilted forwardly and positioned below said partition, a mirror positioned rearwardly of said lens and at an angle of less than forty-five degrees with respect to said partition, and a ground glass pivotally mounted at its rear edge and adjustable about said pivot, said glass being positioned to receive rays reflected from the mirror.

6. In a camera, the combination with a horizontal partition in the camera, of a vertical lens frame, a finding lens mounted in said frame with its upper extremity tilted forwardly and positioned below said partition, a mirror positioned rearwardly of said lens and at an angle of less than forty-five degrees with respect to said partition, a ground glass pivotally mounted at its rear edge and adjustable about said pivot, said glass being positioned to receive rays reflected from the mirror, springs positioned to elevate said glass about its pivot, and manually operable friction means for maintaining said glass in adjusted position against the pressure of said springs.

7. In a camera, the combination with a horizontal partition in the camera, of a vertical lens frame, a finding lens mounted in said frame with its upper extremity tilted forwardly and positioned below said partition, a mirror positioned rearwardly of said lens and at an angle of less than forty-five degrees with respect to said partition, a ground glass pivotally mounted at its rear edge, means for adjusting said glass about its pivot, and a finding hood mounted about the edges of said glass and projecting upwardly and rearwardly thereof.

8. In a camera, the combination with a horizontal partition in the camera, of a vertical lens frame, a finding lens mounted in said frame with its upper extremity tilted forwardly and positioned below said partition, a mirror positioned rearwardly of said lens and at an angle of less than forty-five degrees with respect to said partition, a ground glass pivotally mounted at its rear edge, means for adjusting said glass about its pivot, and a finding hood mounted about the edges of said glass and projecting upwardly and rearwardly thereof, the axis of said hood being substantially coincident with the axis of the rays reflected from the mirror.

In testimony whereof I have affixed my signature.

ECHI R. IWAGAMI.